United States Patent [19]

Westhaver et al.

[11] Patent Number: 4,655,096

[45] Date of Patent: Apr. 7, 1987

[54] FLEXURE MOUNT ASSEMBLY FOR A DYNAMICALLY TUNED GYROSCOPE

[75] Inventors: Robert O. Westhaver, Westwood; Donald W. Carow, East Walpole; Frank R. Archibald, Needham, all of Mass.

[73] Assignee: Northrop Corporation, Los Angeles, Calif.

[21] Appl. No.: 646,420

[22] Filed: Aug. 31, 1984

[51] Int. Cl.$^4$ .............................................. G01C 19/02
[52] U.S. Cl. ....................................... 74/5 F; 464/100
[58] Field of Search .......................... 74/5 F; 308/2 A; 464/98, 100, 117, 119, 136

[56] References Cited

U.S. PATENT DOCUMENTS

| | | | |
|---|---|---|---|
| 2,995,938 | 8/1961 | Brodersen et al. | 74/5 F X |
| 3,077,785 | 2/1963 | Stiles | 74/5 F X |
| 3,211,011 | 10/1965 | Litty | 74/5 F |
| 4,261,211 | 4/1981 | Haberland | 74/5 F |
| 4,326,428 | 4/1982 | Bostwick et al. | 74/5 F |
| 4,499,778 | 2/1985 | Westhaver et al. | 74/5 F |

FOREIGN PATENT DOCUMENTS

| | | | |
|---|---|---|---|
| 2751304 | 5/1978 | Fed. Rep. of Germany | 74/5 F |
| 2818106 | 12/1978 | Fed. Rep. of Germany | 74/5 F |
| 2093183 | 8/1982 | United Kingdom | 74/5 F |
| 2105901 | 3/1983 | United Kingdom | 74/5 F |

Primary Examiner—Lawrence J. Staab
Assistant Examiner—Dwight G. Diehl
Attorney, Agent, or Firm—Kenway & Jenney

[57] ABSTRACT

A flexure mount assembly particularly adapted for use in a dynamically tuned two-degree-of-freedom gyroscope to provide a universal coupling between a rotor element and a drive shaft. The mount features a substantially planar "spider" member normally oriented transversely to the spin axis of the rotor. The spider has four webs, each web extending radially from an inner central area associated with an inner gimbal ring to an outer annular area. The outer annular area is associated with an outer ring which is divided into four independent sectors.

Each web has two sections and each section has the shape of two parabolas which intersect at their vertices. A central aperture roughly elliptical in shape is thus formed in each web. At both ends of each aperture, narrow radial slots are formed. Two mutually perpendicular "vertical" or cross flexure members each have key portions that extend in planes parallel to the spin axis through the radial slots. The inner gimbal ring and the spider have aligned central apertures coaxial with the spin axis which accommodate an alignment member. The vertical flexure members are seated in a set of mutually perpendicular and axially extending slots formed in the alignment member.

The inner gimbal ring and the outer ring are formed by substantially identical upper and lower halves which sandwich the spider. The halves each have a set of radially aligned slots formed in their opposed faces to receive the vertical cross members.

7 Claims, 8 Drawing Figures

FLEXURE MOUNT ASSEMBLY FOR A DYNAMICALLY TUNED GYROSCOPE

BACKGROUND OF THE INVENTION

This invention relates in general to flexure mounts for rotating members. More specifically, it relates to a highly simplified flexure mount for a dynamically tuned two-degree-of-freedom gyroscope having excellent performance characteristics and long life. As is explained in U.S. application Ser. No. 231,242, filed Feb. 3, 1981 by Westhaver et al. entitled "Flexure Mount Assembly For a Dynamically Tuned Gyroscope and Method of Manufacturing Same", and assigned to the assignee of this application, dynamically tuned gyroscopes require a coupling between a rotating shaft and a mass, typically a rotor, supported on the shaft. The coupling must permit pivoting of the rotor relative to the spin axis of the shaft.

The coupling must satisfy a number of criteria. First, it must efficiently transfer rotational torque from the shaft to the rotor while normally maintaining the rotor in a generally predetermined location both axially and radially with respect to the shaft. Second, it must be elastic torsionally about any axis in a plane of rotation perpendicular to the spin axis. The coupling assembly must also provide an anti-spring effect which compensates for the spring coupling in the plane of rotation when the gyro is operating at its resonant speed. The coupling should also be substantially frictionless and isoelastic, that is, it should exhibit substantially uniform elasticity in any torsional direction perpendicular to the spin axis. It is also highly desirable to be able to calculate and fabricate accurately the axial, radial and torsional stiffness of the suspension to design a suspension with the required isoelastic conditions.

U.S. Pat. Nos. 3,452,608 and Stiles U.S. Pat. No. 3,512,419 and Howe U.S. Pat. No. 3,702,568 describe several arrangements intended to achieve the aforementioned objectives. The Stiles U.S. Pat. No. '419 describes a "flexure hinge" which utilizes four arms each having a generally V-shaped cross-section and in the '608 patent a central connecting ring secures four radially extending "hinges", each having a tubular configuration.

The Howe suspension includes a generally flat "disk". It has a central portion secured to a "hub", intermediate "lands" secured to a gimbal ring, and an outer "annulus" secured to an "outermost" rotor ring or a rotor. A set of flat "spokes" connect the central portion of the disk to the outer annulus. The structures of the Stiles patents and the Howe patent are commented on in the above-mentioned Westhaver et al. application.

While the suspensions of the Stiles and Howe patents disclose coupling suitable for use in a dynamically tuned gyroscope, they each have deficiencies which limit their usefulness. For example, it is not simple to accurately align components of the gyroscope with the suspension system during assembly and manufacturing operations. In general, these prior art suspensions require relatively complex and costly jigs to align the component parts of the assembly and maintain that alignment during operations such as brazing or machining. The jig fixtures also typically include arrangements for controlling the placement and/or flow of brazing material to secure the parts to one another. Also, the performance of these systems is not optimal. In particular, with respect to the tubular style hinges, it is difficult in practice to obtain a truly isoelastic mount since the wall thickness and flexure qualities of the tubing are not readily maintained to extremely close tolerances. The Howe system, on the other hand, requires accurate and costly machining of what are typically very small components. Moreover, neither the Stiles nor Howe device enjoys long service life.

An improved flexure mount for a dynamically tuned gyroscope or a similar precision apparatus is disclosed in the above-cited Westhaver et al. application. There, a substantially planar "spider" member oriented transversely to the spin axis of the rotor is used. The spider has a central portion centered on the spin axis and several generally rectangular webs which extend radially from the central portion to an outer annular portion also centered on the spin axis. In the preferred form, the spider has four webs. The flexure mount also includes cross-flexure members that are generally rectangular in configuration except for two generally rectangular "key" portions formed on one longitudinal edge and spaced equally from the center of the member. Each key portion extends freely through an associated radial slot formed along the center of each web. The spider and the cross flexure members are preferably etched from a rolled sheet material of uniform thickness and having substantially uniform flexural characteristics.

In manufacturing such a flexure mount, the central portion of the spider is sandwiched between an upper and lower half of a hub or inner ring (a gimbal ring of a gyroscope). In a like fashion, the outer annulus of the spider is sandwiched between an upper and lower half of an outer ring. The inner ring has a central cylindrical aperture which is coaxial with the spin axis. The central portion of the spider member likewise has a central aperture that has the same dimensions as the aperture of the inner ring. The upper and lower halves of the inner and outer rings have a series of radial slots that receive and locate the cross members.

These components are assembled with the cross flexure members in an orthogonal relationship with respect to one another and with respect to the spider member. The two key portions of one cross member project "upwardly" through two diametrically opposed radial slots in the webs and the two key portions of the other cross member extend "downwardly" through the remaining two slots. The key portions extend vertically a sufficient distance that the length of each cross member lying above and below the "horizontal" web of the spider is substantially the same.

An alignment member, preferably a cylindrical pin, is received in a close fitting relationship in the aligned central apertures of the inner gimbal ring and the spider. The pin has a set of longitudinally extending and mutually perpendicular slots that engage and support the cross members at the central apertures. The pin also maintains the cross members in the desired orthogonal relationship.

To complete the assembly, the upper and lower halves of the inner and outer rings are brazed to the spider member and the cross members. These ring components are preferably formed by simple machining operations. The brazing material is preferably introduced in the form of washer-like annuluses that are sandwiched between the upper and lower ring components and the spider member during assembly. When the components are thus assembled, the unit is heated to a temperature which fuses the brazing material. This step simultaneously brazes the assembly at various locations to form an integral flexure mount. The width of the radial slots in the rings is selected so that the liquid braze material flows into the slots through a capillary action to secure the vertical cross members. Finally, the outer ring and the sandwiched annular portion of the spider are cut at four equiangularly spaced points to form four independent sectors of the outer ring each centered on one of the four or more flexure arms.

The flexure mount of the Westhaver et al. application has proven to be of great value and has performed extremely well in service. Moreover, it has fulfilled all expectations in ease and cost of fabrication. Yet, one significant limitation has persisted, and that is shortened life of the gyros in which the flexure mount has been incorporated when subjected to high stress as might occur during vibration. This shortened life stems from maldistribution of stress in the flexure mount, the stress being disproportionately large at the points of junction of the generally rectangular webs with the central solid portion of the spider and with the annular portion of the spider.

It is with the elimination of such high bending stresses and avoidance of failure of flexure mounts that the present invention is concerned. The primary object of the invention is, therefore, lengthened life and durability of instruments which utilize flexure mounts, particularly dynamically tuned gyroscopes of the two-degree-of-freedom variety.

SUMMARY OF THE INVENTION

Generally, the invention is primarily involved with the web members of the spider of a flexure mount in a dynamically tuned gyroscope. Rather than utilizing web members of generally rectangular configuration and having a rectangular aperture, the preferred structure is formed into a constant strength beam by forming each web in two sections, each section having the shape of a pair of parabolic members joined at their vertices. In this fashion, two pairs of cantilever beams constitute each web of the spider and the greatest strength of the webs is at the points of maximum bending stress when the gyroscope is in operation. For a better understanding of the present invention, there follows a description of a preferred embodiment which should be read with reference to the appended drawing in which:

DETAILED DESCRIPTION OF THE PREFERRED EMBODIMENT

Figure 1:
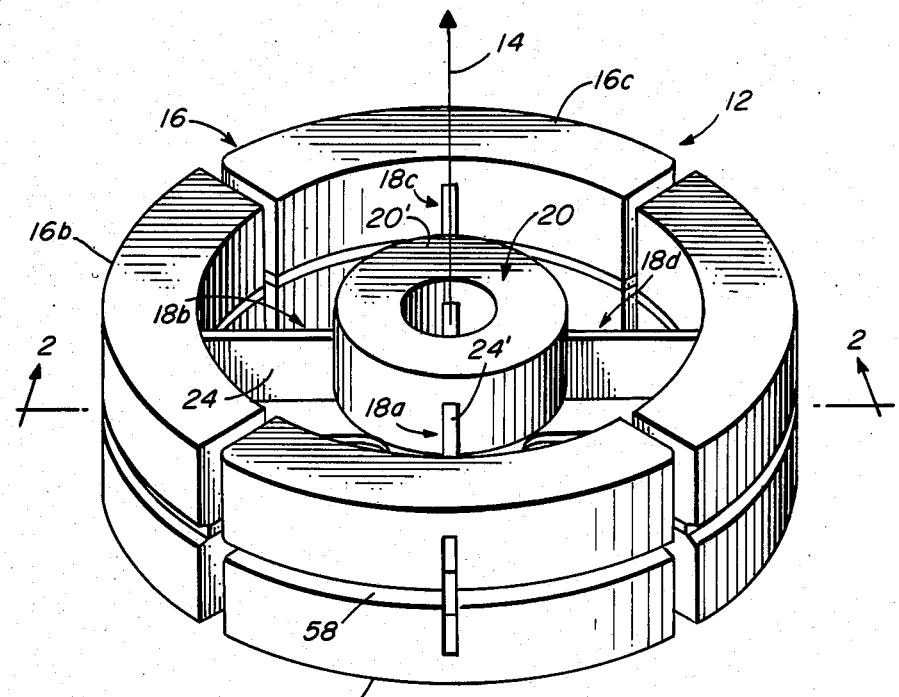
FIG. 1 is a perspective view of a flexure mount for a dynamically tuned gyroscope showing the coupling of two pairs of outer ring sectors to an inner gimbal ring.
Figure 2:
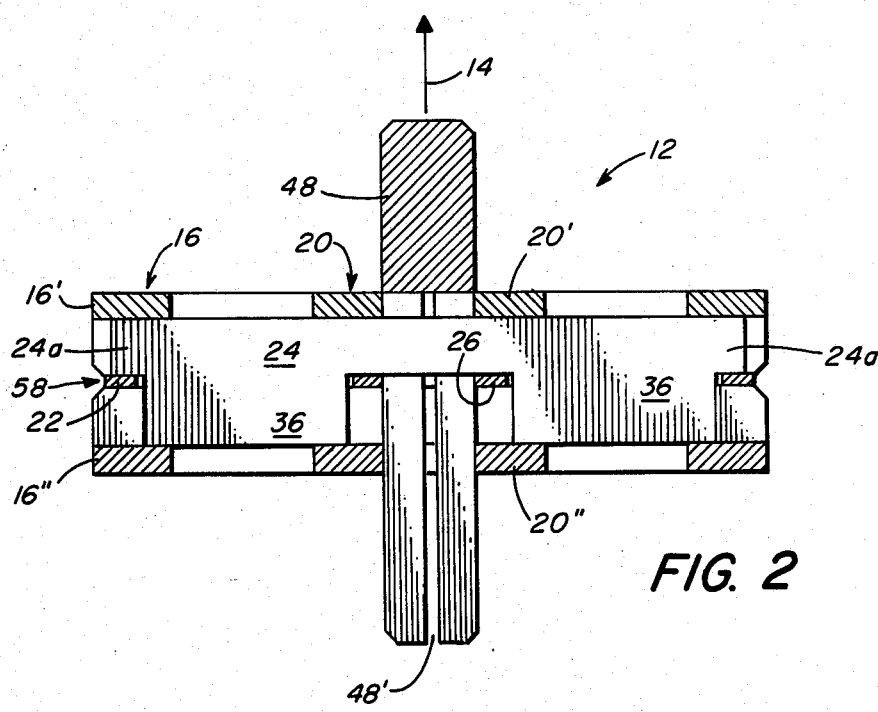
FIG. 2 is a side elevation, partly in vertical section, taken along the lines 2—2 in FIG. 1 and further including an alignment pin.
Figure 3:
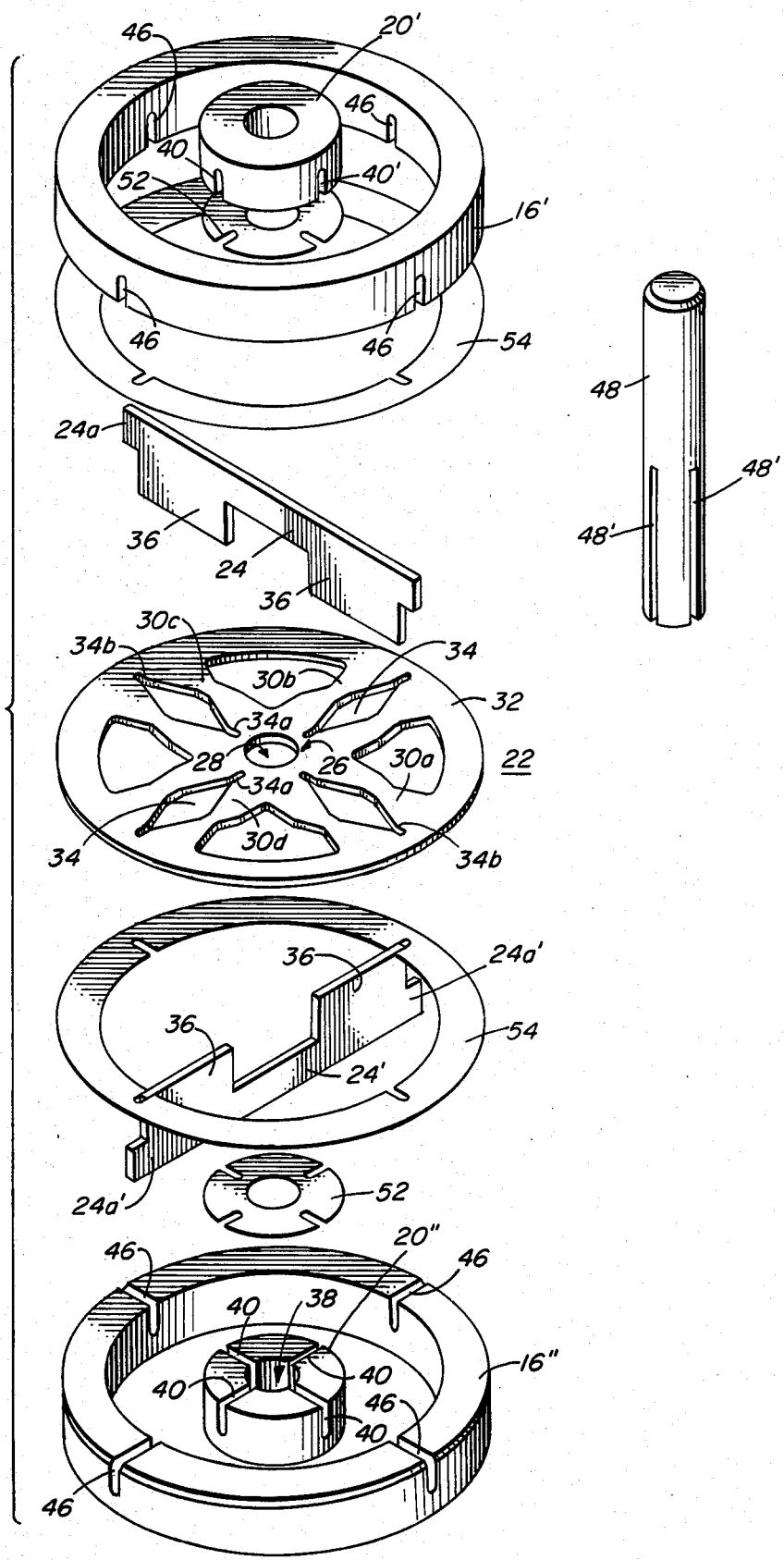
FIG. 3 is an exploded view of the flexure mount of FIGS. 1 and 2 showing parts including a spider prior to their final separation and assembly.

FIGS. 1–3 show a dynamically tuned gyroscope according to the present invention, including means for transmitting power from a drive shaft (not shown) rotating about a spin axis 14 to portions of an outer ring 16. As shown in FIG. 1, the outer ring 16 is divided into four sections, 16a, 16b, 16c, and 16d, that are equiangularly spaced about the spin axis and have substantially the same inertial mass. As explained in detail below, the drive shaft is operatively coupled to a diametrically opposed pair of the ring sections such as sections 16a and 16c. A rotor (not shown) is typically attached to the remaining two diametrically opposed sections 16b and 16d which typically have a slightly larger outside diameter than the sections 16a and 16c.

In FIG. 1, an assembled universal coupling between the drive shaft and the rotor through four flexure arms 18a, 18b, 18c, and 18d is shown. Each arm extends radially from an inner gimbal ring 20 to the midpoint of an associated section of the outer ring 16. Since the flexure arms 18a . . . 18d are elastically resilient, this arrangement provides a universal coupling between the drive shaft and the rotor; that is, the rotor has two degrees of freedom of motion with respect to the drive shaft. Each flexure arm 18a . . . 18d has a cross-section which is characterized by a high axial and radial load-carrying capacity. This design is also usually characterized by low torsional spring rate.

The flexure assembly 12 is fabricated from a group of interlocking components including a spider member 22 and a pair of identical orthogonally disposed cross flexure members 24 and 24'. The spider 22 is oriented generally transversely to the spin axis 14 of the rotor assembly 12. For the purposes of this description, the spin axis 14 is considered as vertically oriented; the spider member is therefore oriented generally horizontally.

The spider has a central portion 26 which is centered on the spin axis 14. Formed in the central portion 26 is a circular opening 28 which is itself centered on the spin axis 14. The spider also has four radially extending webs 30a, 30b, 30c and 30d which terminate in an outer annular portion 32 which is concentric about the spin axis 14. The webs 30a . . . 30d are equiangularly spaced. Each web includes a radially oriented roughly elliptical opening 34 which terminates in identical end slots 34a and 34b. The slots 34a constitute short radial penetrations of the central portion 26 and the slots 34b constitute similar openings in the annular portion 32. The spider 22 as a whole is designed so that it has a substantially uniform distribution of inertial mass about the spin axis 14.

The cross flexure members 24 and 24' each have a generally rectangular configuration but with a pair of spaced key portions 36,36 extending from one longitudinal edge of each member. Each key portion is itself generally rectangular and closely fits associated end slots 34a and 34b, no contact existing between the keys 36 and the wider portions of the openings 34.

One pair of keys, those associated with the member 24 as shown, project downwardly while the keys 36,36 associated with the cross member 24' extend upwardly. The height of the keys and the cross members in the vertical direction is selected so that when the keys are fully seated in the radial end slots (with the adjacent longitudinal edge of the cross member abutting the spider 22), the cross members extend above and below the spider the same distance. The length of each key portion 36 is selected to extend from the inner ring 20 to the outer ring 16, but not to the bases of the associated slots 34a and 34b. A significant advantage of the present invention is that the members 22, 24 and 24' can be etched, stamped, or otherwise formed from precision rolled sheet material and have a substantially uniform thickness as well as desired structural and thermoelastic properties. The central opening 28 can be etched or stamped in the same operation or reamed or drilled in a subsequent operation. A suitable material is a 300-series precipitation hardened stainless steel. The direction of the grain of the material or of the rolling is preferably selected to be coincident with the longitudinal axis of the cross members and midway between adjacent webs of the spider. It should be noted that each of these three components of the flexure mount is substantially planar.

The inner gimbal ring 20 is formed by two identical annular components, an upper half 20' and a lower half 20" having a central, vertically extending opening 38 which aligns with the opening 28 of the spider. Each half 20' and 20" also includes a pair of mutually perpendicular slots 40,40 that extend across the opposed faces of each ring half. The cross members fit closely in the corresponding slots 40,40 to assist in supporting and locating the cross members in the desired vertical orientation with respect to the spider. However, the slots 40,40 are slightly wider than the thickness of the flexure members to facilitate the flow of a brazing material by capillary action to the adjoining surfaces of these elements. The inner ring 20 can, of course, be trimmed to vary its inertia and thereby vary the tuned speed of the gyroscope. Alternatively, separate trim members can be added to the assembly.

Like the inner gimbal ring 20, the outer ring is formed from annular upper and lower halves 16' and 16". The halves 16' and 16" are substantially identical and have generally rectangular cross-sections. Each outer ring half 16' and 16" also includes a mutually perpendicular set of horizontal slots 46,46. The slots 46,46 are positioned to receive the outer ends 24a, 24a' of the vertical cross members 24 and 24' in a generally close-fitting relationship. Both the slots 40,40 and 46,46 are adapted to receive the ends of the key members 36. Like the slots 40,40, the slots 46,46 are usually somewhat wider than the thickness of the cross flexure members to facilitate a flow of brazing material to these surfaces.

The rotor assembly 12 includes an alignment pin 48 which is held closely in the aligned apertures 28 and 38 as is best seen in FIG. 2. The pin is preferably round in cross-section and has a pair of longitudinally extending slots 48',48' that are mutually perpendicular. The slots receive support, and align the cross members 24,24' with respect to the spin axis and with respect to the spider and inner gimbal ring. The support function of the alignment pin also, in part, makes the assembly, to a large extent, self-jigging.

Annular or washer-like forms of braze material such as the braze elements 52,52 and 54,54 (FIG. 3) are sandwiched between the inner and outer ring halves and the spider. Alternatively, the braze material can be inserted as a rod-like slug in a series of braze holes (not shown) formed in the ring halves.

When the braze material reaches the fusing temperature, it flows to the adjacent surfaces of the rings and the spider, including the slots of the vertical cross members and the rings, and secures these members to one another.

It is also possible to use the braze holes in conjunction with annular brazing reliefs formed in the ring halves.

The above-described components according to this invention are particularly adapted to a rapid and low cost assembly technique which requires little or no skill. Assembly according to this invention preferably utlizes only a simple jigging fixture (not shown) that supports the rings and has a central hole to accept the pin 48 and is concentric with the outer rings.

To assemble the components, the lower outer ring half 16" and the lower inner ring half 20" are connected by the lower cross member 24' which is seated in two slots 40,40 of the inner ring and two slots 46,46 of the outer ring. The brazing material 52 and 54 is placed on the lower ring halves 16" and 20". The spider 22 is then fitted over these components with the ends of the upwardly projecting key portions 36 of the cross member 24' engaging end slots 34a and 34b. The upper cross member is assembled by inserting the downwardly projecting key portions 36 into the remaining two radial end slots 34a,34b. The alignment pin 48 is inserted in the aligned apertures 28 and 38 of the inner gimbal ring and the spider with each slot lying at one corner of the crossed pair of vertical members 24,24'. Additional brazing material elements 52 and 54 are placed on the spider. Next, the upper halves 20' and 16' of the inner gimbal ring and the outer ring, respectively, are assembled onto the spider with the upper vertical cross member 24 secured in the remaining vertical slots of the inner and outer rings. End portions of the upwardly projecting key portions 36,36 are also secured in slots of the upper halves 20' and 16'. The inner end slots 34a are enclosed in the inner ring halves and the outer end slots 34b are enclosed in the outer ring halves.

It should be noted that this flexure assembly utilizes comparatively simple components and machining techniques, but is nevertheless to a large extent self-aligning and self-jigging. The alignments of the inner gimbal ring and spider with respect to the spin axis and one another are provided by the alignment pin 48 in cooperation with the cross members 24,24' as described above. The cross members are located in desired spacial orientation by the pin, and the slots in the inner and outer rings.

The assembled components are secured to one another in the desired relationship by heating the assembly to a point where the brazing material fuses and secures the inner and outer ring halves to the intermediate, "sandwiched" spider member. The brazing also secures the ends and centers of the cross members 24 and 24' to the inner and outer rings and to the adjoining portions of the spider. The invention therefore allows the simultaneous brazing of all the components of the assembly with brazing operations performed at multiple locations at the same time.

Any standard braze material and techniques for the material selected can be used. A material which has been found to be useful is a silver alloy with a melting point of approximately 1300 F. During the brazing, the assembly is also heat-treated and aged by heating it to 1800 F., cooling it slowly to room temperature, then down to −100 F., and back up to room temperature. Brazing is preferably done in a vacuum without a flux. During the brazing, excess braze material will flow to the chamber 58 formed at the outer edge of the outer ring 16 and the slots of the alignment pin 48 where it will automatically distribute itself evenly. Because there is a significant clearance between the central portions of each key and the wide central areas of the openings 34, the braze material is limited in its flow to the end slots 34a and 34b. Thus, there is no danger that the vertical members will not flex independently of one another. Once brazed and cooled, the outer ring and sandwiched portions of the outer annular portion 32 of the spider and of the outer ring can be cut into four independent sectors 16a . . . 16d as shown in FIG. 1.

By way of illustration, but not of limitation, the following dimensions are representative of a rotor assembly of the type shown in FIGS. 1-3. The spider and cross vertical flexure members 24 and 24' are formed from a stainless steel strip having a thickness approximately 0.0030 inch. The spider has an outer diameter approximately 0.43 inch. The overall length of the opening 34 and the radial slots 34a and 34b is approximately 0.150 inch. The maximum width of the opening 34 is about 0.0195 inch and the width of the slots 34a,34b is about 0.006 inch to accommodate the vertical flexure tabs which are about 0.003 inch thick.

The cross members have an overall length of approximately 0.43 inch and a height, exclusive of the key portions 36, of approximately 0.385 inch. The key portions 36 each have a height of 0.0415 inch and a length of 0.160 inch. Each outer ring half has an outer diameter of 0.4497 inch and an inner diameter of 0.3502 inch with the vertical slots 46,46 extending radially to a depth of approximately 0.040 inch with a width of 0.005 inch. Each half 16' and 16" has a height of approximately 0.120 inch. The inner ring preferably has a maximum outer diameter of 0.150 inch, a minimum outer diameter of 0.065 inch and each half has a height of approximately 0.058 inch. The pin 48 extends 0.34 inch with a diameter of 0.0626 inch. The slots 48' extend 0.223 inch and have a width of 0.005 inch.

Focussing on the spider as seen in FIG. 3, there may be seen an inner central area 26 which is joined to an annular outer area 32 by four identical equiangularly spaced radial web members. Considering a typical web 30d, it may be seen that it consists of two sections which are mirror-images of each other lying on opposite sides of the roughly elliptical central opening 34. Each section has two relatively wide ends joined to the central area 26 and the outer annular area 32, respectively. Each section also has a relatively narrow waist portion roughly midway of its length. The development of these configurations of the webs and their purpose is explained hereinafter.

Figure 4:
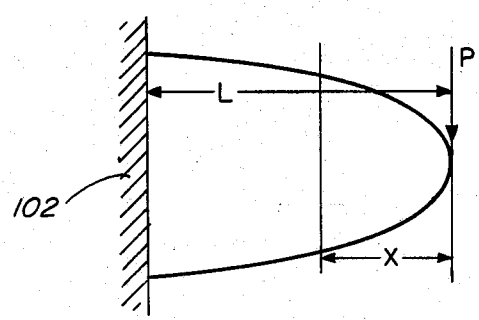
FIGS. 4–8 are diagrams showing the evolution of the parabolic configuration of the dual web.

In FIG. 4, there is shown a cantilever beam of parabolic shape and length L supported as at 102. The application of a load at its unsupported ends may be represented by P. In the case of a parabolic configuration as here, the beam depth, h, is not constant but has a value of y at any point X, the stress S being constant at all points X. The stress formula may then be reduced to the equation of the parabola of FIG. 4. However, the web sections of the spider are not simple cantilevers, but beams supported at both ends.

Figure 5:
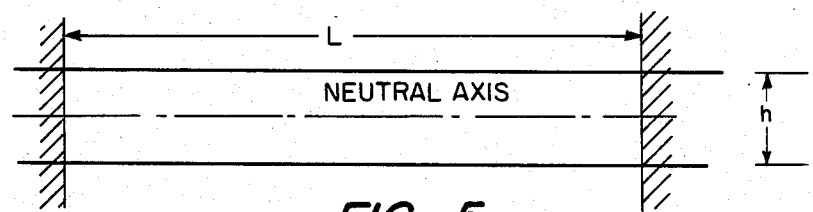
Figure 6:
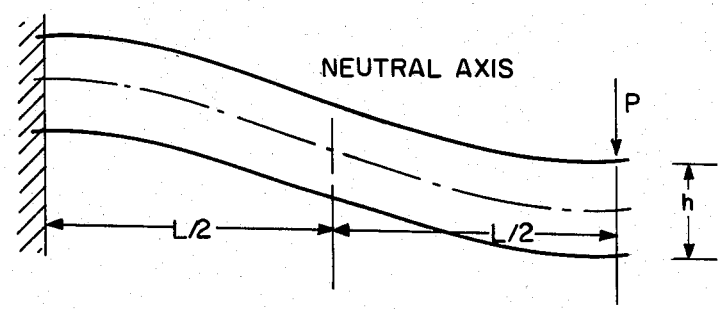

FIG. 5 is a schematic representation of a simple beam of length L and height h held rigidly at both ends. Assuming force is applied as at P, bending takes place as shown in FIG. 6, and the right end moves downward. Effectively, the structure behaves like two cantilevers, each of length L/2 and each loaded by a force P.

Figure 7:
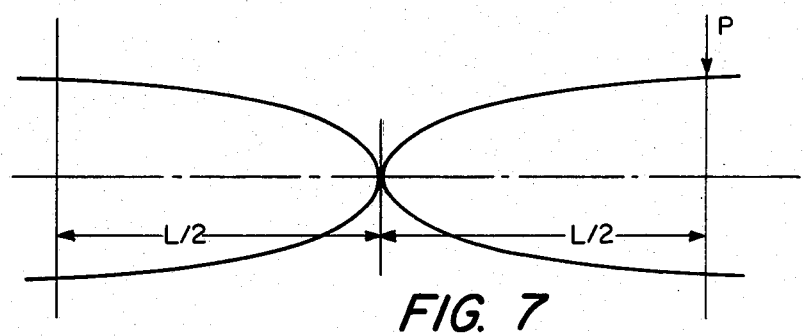
Figure 8:
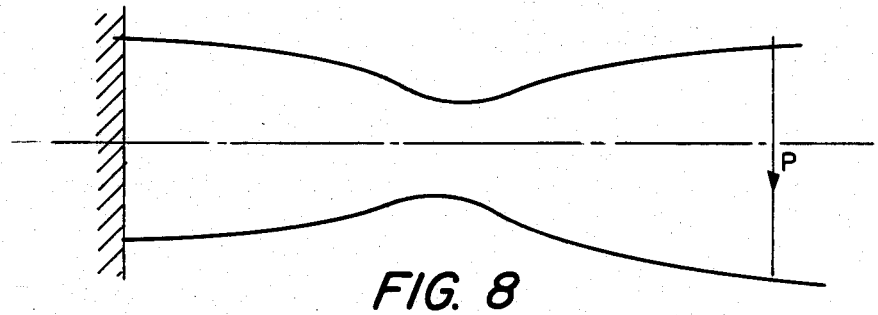

In FIG. 7, two parabolic members, each of a length L/2, such as those shown in FIG. 4, are substituted for the beam of FIG. 6. Because the two parabolas meet at a point contact of their vertices, a central junction is formed by the addition of an area of bridging material as shown in FIG. 8 to provide a practical structure The bridging area is, of course, created in the original stamping operation by which the spider is formed.

In prior art spiders having generally rectangular webs, stresses experienced during twisting of the pivot are maximum at the beam ends where it is supported and zero at the center. Fatigue failure occurs at the high stress points. In the constant stress beam of the present invention, stress is reduced and evenly distributed and will not tend to cause a failure of the spider.

When used in a dynamically tuned gyroscope, the flexure mount of the invention has structural and thermoelastic properties superior to those of a costly highly machined one-piece flexure mount, but with a markedly lower cost of manufacture. In particular, the flexure mount is preferably formed from three elements having comparatively simple configurations which can be fabricated from relatively low cost sheet material. When used to mount the components of the dynamically tuned gyroscope, the associated inner and outer rings can be formed with simple machining operations and enclose the narrow radial slots at the ends of the webs, preventing any unwanted effects on flexure spring action. The invention also provides an assembly which secures the various components into a single integral unit through simultaneous brazing operations at multiple locations. The brazing operation does not require complex and costly fixtures typically used in prior art construction techniques. Finally, the configuration of the spider having joined parabolic cantilever webs contributes to long life, more precise fabrication, and improved gyro performance.

While the invention has been described with respect to its preferred embodiments used to mount the components of a dynamically tuned gyroscope to provide a universal coupling between a drive shaft and a rotor, various alterations and modifications will become apparent to those skilled in the art from the foregoing description and accompanying drawings. Such modifications and alterations are intended to fall within the scope of the appended claims.

What is claimed and is desired to be secured by U.S. Pat. Nos. is:

1. In an inertial instrument having a driving shaft and a driven rotating member which are normally coaxial with a spin axis, a flexure mount for coupling said driving shaft to said driven rotating member which permits two-degree-of-freedom angular deflection of said driven member about axes normal to said spin axis comprising a spider normally disposed transversely to said spin axis and having four equiangularly disposed webs extending from an inner central area adjacent said drive shaft to an outer annular area adjacent said rotating member, each of said webs including two similar sections, each said section having the approximate shape of two parabolas joined at their vertices.

2. In an inertial instrument as defined in claim 1, the flexure mount wherein said spider has relatively large apertures formed between the two sections of each said web, each said aperture being extended by relatively small radially extending slots formed in said inner central area and in said outer annular area.

3. In an inertial instrument as defined in claim 2, the combination which includes cross flexure members having key portions, said key portions being brazed into said radially extending slots.

4. In an inertial instrument as defined in claim 1, the combination wherein each said section includes an area of bridging material at said vertices to form a junction therebetween.

5. In an inertial instrument as defined in claim 1, the combination wherein each of said sections of each of said webs comprises a pair of cantilevers.

6. In an inertial instrument as defined in claim 2, the combination therewith of cross-vertical members having key portions formed thereon, said key portions being engaged in said relatively small radially extending slots.

7. In an inertial instrument as defined in claim 1, the combination wherein each of said webs is configured along its length to form a constant stress beam.

* * * * *